United States Patent
Cooke et al.

(10) Patent No.: US 7,149,761 B2
(45) Date of Patent: Dec. 12, 2006

(54) SYSTEM AND METHOD FOR MANAGING THE SYNCHRONIZATION OF REPLICATED VERSION-MANAGED DATABASES

(75) Inventors: Iain C Cooke, Edinburgh (GB); Gary S M Thomson, Edinburgh (GB); Lucy Bastin, Birmingham (GB)

(73) Assignee: Tadpole Technology PLC, Cambridge (GB)

( * ) Notice: Subject to any disclaimer, the term of this patent is extended or adjusted under 35 U.S.C. 154(b) by 315 days.

(21) Appl. No.: 09/991,485

(22) Filed: Nov. 13, 2001

(65) Prior Publication Data

US 2003/0093431 A1    May 15, 2003

(51) Int. Cl.
G06F 12/00    (2006.01)
(52) U.S. Cl. ...................... 707/203; 707/200
(58) Field of Classification Search ......... 707/1–104.1, 707/200–205; 709/200–202, 204–205, 213, 709/223–224, 238; 714/1, 2, 15, 100
See application file for complete search history.

(56) References Cited

U.S. PATENT DOCUMENTS

| | | | | |
|---|---|---|---|---|
| 5,649,195 A * | 7/1997 | Scott et al. | ................... | 707/201 |
| 5,684,984 A * | 11/1997 | Jones et al. | ................... | 707/10 |
| 5,806,075 A * | 9/1998 | Jain et al. | ................... | 707/201 |
| 5,926,816 A * | 7/1999 | Bauer et al. | ................... | 707/8 |
| 6,006,274 A * | 12/1999 | Hawkins et al. | ............. | 709/248 |
| 6,012,059 A * | 1/2000 | Neimat et al. | ................. | 707/8 |
| 6,065,017 A * | 5/2000 | Barker | ....................... | 707/202 |
| 6,131,096 A * | 10/2000 | Ng et al. | ...................... | 707/10 |
| 6,151,606 A * | 11/2000 | Mendez | ...................... | 707/201 |
| 6,212,529 B1 * | 4/2001 | Boothby et al. | ............. | 707/201 |
| 6,317,754 B1 * | 11/2001 | Peng | .......................... | 707/203 |
| 6,343,299 B1 * | 1/2002 | Huang et al. | ............... | 707/203 |
| 6,393,434 B1 * | 5/2002 | Huang et al. | ................ | 707/200 |
| 6,671,757 B1 * | 12/2003 | Multer et al. | ................ | 710/100 |
| 6,694,336 B1 * | 2/2004 | Multer et al. | ................ | 707/201 |
| 6,728,702 B1 * | 4/2004 | Subramaniam et al. | ........ | 707/3 |
| 6,922,685 B1 * | 7/2005 | Greene et al. | ................. | 707/1 |
| 2001/0005849 A1 * | 6/2001 | Boothby et al. | ............... | 707/1 |
| 2002/0049776 A1 * | 4/2002 | Aronoff et al. | ............. | 707/200 |
| 2002/0065879 A1 * | 5/2002 | Ambrose et al. | ........... | 709/203 |
| 2003/0069874 A1 * | 4/2003 | Hertzog et al. | ................ | 707/1 |
| 2003/0088545 A1 * | 5/2003 | Subramaniam et al. | ........ | 707/3 |

OTHER PUBLICATIONS

Smallworld Software Documentation, "Smallworld View Tools", Sep. 1998, pp. 1-3.*
Smallworld Software Documentation, "Style System", 1997-1999, pp. 1-5.*
Smallworld Software Documentation, "Translators: DXF and NTF", Mar. 1995, pp. 1-6.*

(Continued)

*Primary Examiner*—Luke S Wassum
*Assistant Examiner*—Linh Black
(74) *Attorney, Agent, or Firm*—William A. English; Cohen Sakaguchi & English LLP (57) ABSTRACT

A system and method for synchronizing a local replicated database with remote replicated databases. Generally, the system includes a local replicated database and a synchronization manager associated with the local replicated database. The synchronization manager may send changes made on the local replicated database to one or more remote replicated databases for reconstruction by the one or more remote replicated databases, and may receive changes made on a remote replicated database. In addition, the synchronization manager may reconstruct changes received from a remote replicated database on the local replicated database. Preferably, the synchronization manager may send, receive, and reconstruct changes independently from one another, i.e., may perform one or more of these activities autonomously and/or asynchronously.

11 Claims, 10 Drawing Sheets

OTHER PUBLICATIONS

Smallworld Software Documentation, "Geometry", 1993-1999, pp. 1-17.*

Smallworld Software Documentation, "Globalisation", 1997-1999, pp. 1-10.*

Smallworld Software Documentation, "Graphics", 1996-1999, pp. 1-14.*

Smallworld Software Documentation, "Installation", 1995-1999, pp. 1-13.*

Smallworld Software Documentation, "Magik ", 1994-1999, pp. 1-5.*

Smallworld Software Documentation, "Open Systems", 1995-1999, pp. 1-15.*

Smallworld Software Documentation, "Plotting and Drawing", 1996-1999.*

Smallworld Software Documentation, Feb. 22, 2002, "Application Development", pp. 1-42.

Smallworld Software Documentation, "Using the HTML Help Viewer", Feb. 22, 2000, pp. 1-17.

Smallworld Software Documentation, "Database", Nov. 1999, pp. 1-27.

* cited by examiner

| NUMBER | EVENT | LOCAL SEQ TABLE | VERSIONS & STATE(S) | LOCAL SEQ | REMOTE SEQ | VERSIONS & STATE(S) | REMOTE SEQ TABLE | LOCAL IN Q | REMOTE IN Q |
|---|---|---|---|---|---|---|---|---|---|
| 100 | START | | | | | | | | |
| 105 | REMOTE MAKES CHANGES, SAVES STATE 35. SENDS CHANGES MARKED N, A, 35, UPDATES SEQ TABLE | A,M,51,34 | LIV-51 | A | M | RIV-34 | M,A,34,51 | | |
| | | A,M,51,34 | LIV-51 | B | N | RIV-35 | M,A,34,51 N,A,35,? | C/N,A,35 | |
| 110 | LOCAL MAKES CHANGES SAVES STATE 61. SENDS CHANGES MARKED B,M,61, UPDATES SEQ TABLE | A,M,51,34 B,M,61,? | LIV-61 | B | N | RIV-35 | M,A,34,51 N,A,35,? | C/N,A,101 | C/B,M,61 |
| 115 | LOCAL RECEIVES CHANGE FILE A,N,35. CREATES TEMP W/ STATE 51 (by looking up A,M in seq table) AND IMPORTS, CRE- ATING STATE 65. SENDS Ack A,N,65, UPDATES SEQ TABLE | A,M,51,34 B,M,61,? A,N,65,35 | LIV-61 Temp-65 | B | N | RIV-35 | M,A,34,51 N,A,35,? | | C/B,M,61 A/A,N,65 |
| 120 | | | | | | | | | |
| 125 | LOCAL RECONCILES TEMP WITH LIV, RESOLVING ANY CONFLICTS USING STANDARD RULES. CREATES STATE 66, CORRESPONDING TO B,N. | A,M,51,34 B,M,61,? A,N,65,35 | LIV-61 Temp-66 | B | N | RIV-35 | M,A,34,51 N,A,35,? | | C/B,M,61 A/A,N,65 |
| 130 | LOCAL POSTS TO LIV. SENDS Ack B,N,66. UPDATES SEQ TABLE IF THERE WERE CONFLICTS, THEN PARKS VERSIONS POINT- ING TO STATES 61 AND 65, TO ALLOW REPLAY OF RECONCILE BY HUMAN AGENT | A,M,51,34 B,M,61,? A,N,65,35 B,N,66,? | LIV-66 Parked-61 Parked-65 | B | N | | M,A,34,51 N,A,35,? | | C/B,M,61 A/A,N,65 A/B,N,66 |

FIG. 5A

| | | | | | | | |
|---|---|---|---|---|---|---|---|
| 135 | REMOTE MAKES CHANGES, SAVES STATE 36. SENDS CHANGES MARKED O, A, 36, UPDATES SEQ TABLE | A,M,51,34<br>B,M,61,?<br>A,N,65,35<br>B,N,66,? | LIV-66<br>Parked-61<br>Parked-65 | B | O | RIV-36 | M,A,34,51<br>N,A,35,?<br>O,A,36,? | C/O,A,36 | C/B,M,61<br>A/A,N,65<br>A/B,N,66 |
| 140<br>145 | REMOTE RECEIVES B,M,61 CREATES TEMP AT STATE 34 (by looking up AM in seq table) AND IMPORTS, CREATING STATE 40. SENDS Ack M,B,40, UPDATES SEQ TABLE | A,M,51,34<br>B,M,61,?<br>A,N,65,35<br>B,N,66,? | LIV-66<br>Parked-61<br>Parked-65 | B | O | RIV-36<br>Temp-40 | M,A,34,51<br>N,A,35,?<br>O,A,36,?<br>M,B,40,61 | C/O,A,36<br>A/M,B,40 | A/A,N,65<br>A/B,N,66 |
| 150 | TOO MANY STEPS BETWEEN M AND O TO RECONCILE DIRECTLY. REMOTE CREATES Temp2, SETS TO STATE 35 (local sequence N) | A,M,51,34<br>B,M,61,?<br>A,N,65,35<br>B,N,66,? | LIV-66<br>Parked-61<br>Parked-65 | B | O | RIV-36<br>Temp-40<br>Temp2-35 | M,A,34,51<br>N,A,35,?<br>O,A,36,?<br>M,B,40,61 | C/O,A,36<br>A/M,B,40 | A/A,N,65<br>A/B,N,66 |
| 155 | REMOTE RECONCILES TEMP WITH Temp2, APPLYING CONFLICT RULES, CREATING NEW STATE 41 | A,M,51,34<br>B,M,61,?<br>A,N,65,35<br>B,N,66,? | LIV-66<br>Parked-61<br>Parked-65 | B | O | RIV-36<br>Temp-40<br>Temp2-41 | M,A,34,51<br>N,A,35,?<br>O,A,36,?<br>M,B,40,61 | C/O,A,36<br>A/M,B,40 | A/A,N,65<br>A/B,N,66 |
| 160 | REMOTE POSTS TO TEMP, SENDS Ack N,B,41, UPDATES SEQ TABLE. DELETES Temp2 IF NO CONFLICTS DURING RECONCILE | A,M,51,34<br>B,M,61,?<br>A,N,65,35<br>B,N,66,? | LIV-66<br>Parked-61<br>Parked-65 | B | O | RIV-36<br>Temp-41 | M,A,34,51<br>N,A,35,?<br>O,A,36,?<br>M,B,40,61 | C/O,A,36<br>A/M,B,40<br>A/N,B,41 | A/A,N,65<br>A/B,N,66 |
| 165 | RIV NOW REFERENCES AO, TEMP REFERENCES BN. ONLY ONE STEP ON EITHER SIDE, SO ALLOWED TO RECONCILE. REMOTE RECONCILES TEMP WITH RIV, CREATING STATE 42. | A,M,51,34<br>B,M,61,?<br>A,N,65,35<br>B,N,66,? | LIV-66<br>Parked-61<br>Parked-65 | | | RIV-36<br>Temp-42 | M,A,34,51<br>N,A,35,?<br>O,A,36,?<br>M,B,40,61<br>N,B,41,? | C/O,A,36<br>A/M,B,40<br>A/N,B,41 | A/A,N,65<br>A/B,N,66 |

*FIG. 5B*

| | | | | | | |
|---|---|---|---|---|---|---|
| REMOTE POSTS TO RIV. SENDS Ack O,B,42, UPDATES SEQ TABLE. DELETES TEMP IF NO CONFLICTS DURING RECONCILE | A,M,51,34<br>B,M,61,?<br>A,N,65,35<br>B,N,66,? | LIV-66<br>Parked-61<br>Parked-65 | B | O | RIV-42 | M,A,34,51<br>N,A,35,?<br>O,A,36,?<br>M,B,40,61<br>N,B,41,?<br>O,B,42,? | C/O,A,36<br>A/M,B,40<br>A/N,B,41<br>A/O,B,42 | A/A,N,65<br>A/B,N,66 |
| REMOTE RECEIVES Acks A,N,65, AND B,N,66, UPDATES SEQ TABLE | A,M,51,34<br>B,M,61,?<br>A,N,65,35<br>B,N,66,? | LIV-66<br>Parked-61<br>Parked-65 | B | O | RIV-42 | M,A,34,51<br>N,A,35,65<br>O,A,36,?<br>M,B,40,61<br>N,B,41,66<br>O,B,42,? | C/O,A,36<br>A/M,B,40<br>A/N,B,41<br>A/O,B,42 | |
| LOCAL RECEIVES CHANGE FILE A,O,36. CREATES TEMP WITH STATE 65 (by looking up A,N in seq table) AND IMPORTS, CREATING STATE 70. SENDS Ack A,O,70, UPDATES SEQ TABLE. | A,M,51,34<br>B,M,61,?<br>A,N,65,35<br>B,N,66,?<br>A,O,70,36 | LIV-66<br>Parked-61<br>Parked-65<br>Temp-70 | B | O | RIV-42 | M,A,34,51<br>N,A,35,65<br>O,A,36,?<br>M,B,40,61<br>N,B,41,66<br>O,B,42,? | A/M,B,40<br>A/N,B,41<br>A/O,B,42 | A/A,O,70 |
| LOCAL RECONCILES TEMP WITH LIV. RESOLVING ANY CONFLICTS USING STANDARD RULES. CREATES STATE 71, CORRESPONDING TO B,O. | A,M,51,34<br>B,M,61,?<br>A,N,65,35<br>B,N,66,?<br>A,O,70,36 | LIV-66<br>Parked-61<br>Parked-65<br>Temp-71 | B | O | RIV-42 | M,A,34,51<br>N,A,35,65<br>O,A,36,?<br>M,B,40,61<br>N,B,41,66<br>O,B,42,? | A,M,B,40<br>A,N,B,41<br>A,O,B,42 | A/A,O,70 |
| LOCAL POSTS TO LIV. SENDS Ack B,O,71, UPDATES SEQ TABLE. DELETES TEMP IF NO CONFLICTS. | A,M,51,34<br>B,M,61,?<br>A,N,65,35<br>B,N,66,?<br>A,O,70,36<br>B,O,71,? | LIV-71<br>Parked-61<br>Parked-65 | B | O | RIV-42 | M,A,34,51<br>N,A,35,65<br>O,A,36,?<br>M,B,40,61<br>N,B,41,66<br>O,B,42,? | A,M,B,40<br>A,N,B,41<br>A,O,B,42 | A/A,O,70<br>A/B,O,71 |

FIG. 5C

| | | | | | | |
|---|---|---|---|---|---|---|
| LOCAL RECEIVES Ack FILES MB40, NB41, OB42. UPDATES SEQ TABLE | A,M,51,34<br>B,M,61,40<br>A,N,65,35<br>B,N,66,41<br>A,O,70,36<br>B,O,71,42 | LIV-71<br>Parked-61<br>Parked-65 | B | O | RIV-42 | M,A,34,51<br>N,A,35,65<br>O,A,36,?<br>M,B,40,61<br>N,B,41,66<br>O,B,42,? | A/M,B,40<br>A/N,B,41<br>A/O,B,42 | A/A,O,70<br>A/B,O,71 |
| REMOTE RECEIVES Ack FILES AO70, BO71. UPDATES SEQ TABLE | A,M,51,34<br>B,M,61,40<br>A,N,65,35<br>B,N,66,41<br>A,O,70,36<br>B,O,71,42 | LIV-71<br>Parked-61<br>Parked-65 | B | O | RIV-42 | M,A,34,51<br>N,A,35,65<br>O,A,36,70<br>M,B,40,61<br>N,B,41,66<br>O,B,42,71 | | |

SYSTEM AND METHOD FOR MANAGING THE SYNCHRONIZATION OF REPLICATED VERSION-MANAGED DATABASES

FIELD OF THE INVENTION

The present invention relates generally to replicated version-managed databases, and more particularly to systems and methods for managing the synchronization of replicated version-managed databases.

BACKGROUND OF THE INVENTION

A database transaction is a group of related updates against a database that form a single "unit of work." There are basically two types of transactions: "short transactions" and "long transactions." Short transactions typically take a few seconds or less to complete. A simple example is a bank account transfer, which may involve subtracting the appropriate amount from an entry in one account and adding the same amount to another account. Since this may take a relatively short period of time to complete, the records may be locked while the transaction is in progress to ensure that nobody else is able to change them and create any inconsistencies.

In contrast, a long transaction may take hours, weeks, or months. An example is a transaction within a Geographic Information System (GIS)-a computer-based tool for mapping and analysing spatial data, such as geographic data and engineering designs. During a GIS transaction, an engineer may generate design alternatives or spatial analysts may perform complex "what if" scenarios. Because these transactions may take a long period of time, locking records for an environment with multiple users who need to access the same data is inefficient and counterproductive. Concurrent control becomes a critical issue.

One known method for solving the long transaction problem is version management. A version is a logical copy of the database specific for a small group of users or for a single user without duplication of the data. This allows multiple users simultaneous access to the same data without applying locks to prohibit other users from modifying the same data. A version managed database system maintains these versions and any conflict that arises from them.

Figure 1:
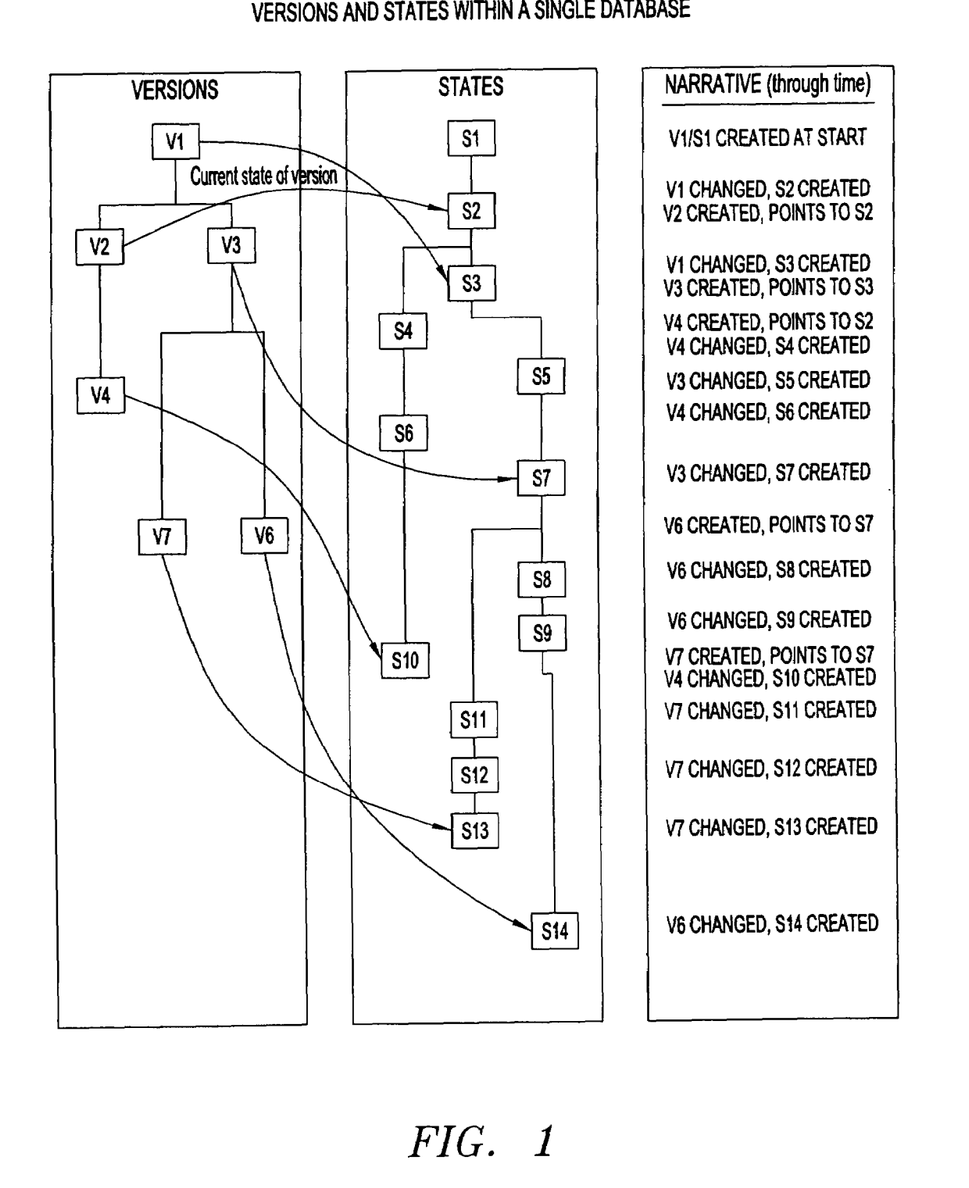
FIG. 1 is an illustration showing the operation of a conventional version-managed database.

A version is a named logical embodiment of a database state distinct from other versions. The number and state of database records visible within a version may change over time. Versions are generally arranged in a tree structure, as depicted in FIG. 1, and any version may be changed by users or processes independently of and without affecting the data visible in another version. It is known in the art to have changes in one version made available to other versions using the processes of reconcile and post.

A state is a labeled snapshot of a version. Each version points to a specific state. Multiple versions may share the same state if desired. If they do, then users may see identical data in both versions. Over time, versions may move from one state to another. As changes are made to a version, its state may change. The states are containers for the changes to the database. As changes are made to a version, the changes are tagged with the appropriate state. Database states are organized as a tree, where the parent/child relationship may be derived from the state lineage. States are not necessarily explicit within all implementations of version-managed databases.

FIG. 1 illustrates these components working together in a version-managed database. V1 is the first version, and S1 is the first state. V1 is set to S1. Then, a change is made to V1. This change is applied to S1, thus creating a new state S2. A new version is created, V2, and is set to S2. Thus, at this time, V1 and V2 are set to S2. Next, V1 changes again, applying the changes to S2 creates a new state, S3. S2, and hence V2, are unchanged by this operation. V3 is created and set to S3. Thus, V3 and V1 are both pointing to S3.

Next, V4 is created, and set to S2. Changes are made to V4, creating a new state derived from S2, called S4. V4 is set to S4. Changes are then made to V3, creating a new state derived from S3 called S5. Changes are next made to V4, creating S6, derived from S4.

Next, V3 is changed, creating S7, derived from S5. A new version, V6, is created, pointing to S7. V6 is changed, creating S8, derived from S7. V6 is changed again, creating S9, derived from S7. V7 is next created, set to S7. Then, V4 is changed, which was pointing to S6 last, creating S10, derived from S6. V7 is then changed, which was last pointing to S7, thus creating a new S11, derived from S7. V7 is changed again, creating S12, then S13. Finally, V6 is changed, creating S14, derived from S9.

This illustration shows the concepts of versions and states and how these two elements interact with each other.

Figure 2:
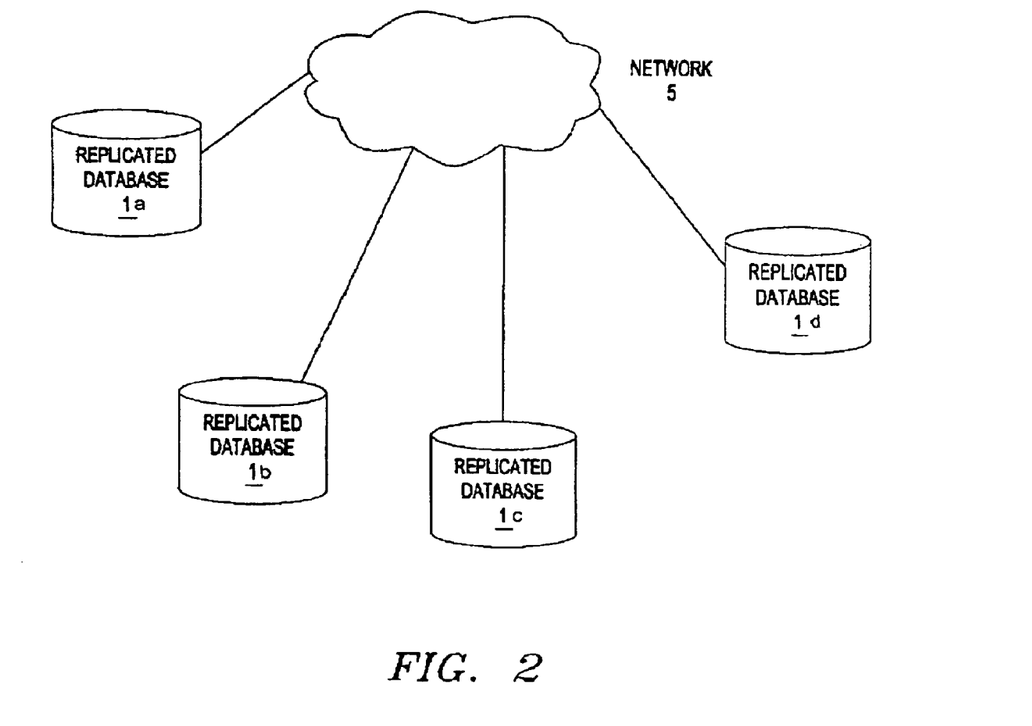
FIG. 2 shows a conventional replicated database network.

A very common requirement for companies who use these database systems is to be able access the data in multiple, geographically separate locations, as depicted in FIG. 2. Version-managed databases 1a–1d may be connected through a variety of networks 5. This requires a system of replication, where the database is replicated in multiple locations. In such a system, data synchronization management between the databases becomes critical to ensure reliable data at every location.

One such system, "Smallworld 3" from GE Smallworld, Inc., manages the replication and synchronization of version managed databases by relying on a single process to connect live to all of the databases at once in order to synchronize. This single process gains exclusive control of the relevant versions and records in all of the databases being synchronized, thus preventing access to the data during the synchronization process. In the case where the network 5 connecting the version managed databases 1 is unreliable or high-speed communications between database 1 sites is unavailable, single process synchronization may be inefficient.

Accordingly, it is believed that systems and methods for synchronizing replicated version-managed databases would be considered useful.

SUMMARY OF INVENTION

The present invention is directed to systems and methods for managing replicated version-managed databases, and more particularly to systems and methods for managing the synchronization of replicated version-managed databases.

In accordance with a first aspect of the present invention, a system is provided for synchronizing a local replicated database with one or more remote replicated databases. Generally, the system includes a local replicated database, and a synchronization manager associated with the local replicated database. In addition, the system may include an interface associated with the local replicated database for communicating with one or more remote replicated databases via a communications link.

The synchronization manager may be configured for sending changes made on the local replicated database to one or more remote replicated databases for reconstruction by the one or more remote replicated databases, and/or receiving changes made on a remote replicated database. In addition, the synchronization manager may be configured for reconstructing changes received from a remote replicated database on the local replicated database. In a preferred embodiment, the synchronization manager may send changes, receive changes, and/or reconstruct changes independently from one another, i.e., may perform one or more of these activities autonomously and/or asynchronously.

In accordance with another aspect of the present invention, a system is provided for synchronizing one or more replicated databases at least intermittently communicating with one another. Generally, the system includes a first replicated database and a second replicated database at least intermittently disconnected from the first replicated database. Generally, at least one of the first and second databases, and preferably both, may include an interface for communicating with each other via a communications link.

The system also includes a synchronization manager associated with each of the first and second databases. For example, the synchronization manager associated with the first database may be configured for sending changes made on the first replicated database to the second replicated database, receiving changes made on the second replicated database, and/or reconstructing changes received from the second replicated database on the first replicated database. Similarly, the synchronization manager associated with the second replicated database may be configured for sending changes made on the second replicated database to the first replicated database, receiving changes made on the first replicated database, and/or reconstructing changes received from the first replicated database on the second replicated database.

Thus, each of the databases in a replicated database network may include a synchronization manager, thereby allowing each database to autonomously and/or asynchronously exchange changes and/or reconstruct changes independent of other databases in the system. Another advantage of the synchronization manager is that it may monitor activities of the local database with which it is associated and selectively perform one or more of its activities when it most efficient to do so. For example, the synchronization manager may send and/or receive changes when the interface of the local database is available, e.g., not being used for other tasks. In addition or alternatively, the synchronization manager may reconstruct changes, e.g., to synchronize the local database with other databases, when the local database has resources, e.g., processor or memory capacity, available or at times that substantially minimize interference with operation of the local database. Thus, the synchronization manager may operate substantially undetected by users of the local database, while still maintaining the local database substantially synchronized with other databases in the network.

Other objects and features of the present invention will become apparent from consideration of the following description taken in conjunction with the accompanying drawings.

BRIEF DESCRIPTION OF THE DRAWINGS

FIGS. 5(*a*)–(*c*) are a series of tables, illustrating a method for synchronizing a local database and a remote database using a synchronization manager, in accordance with the present invention.

FIGS. 6(*a*)–(*c*) is a series of charts, illustrating a method for synchronizing a local database and a remote database using a synchronization manager, in accordance with the present invention.

DETAILED DESCRIPTION

Figure 3:
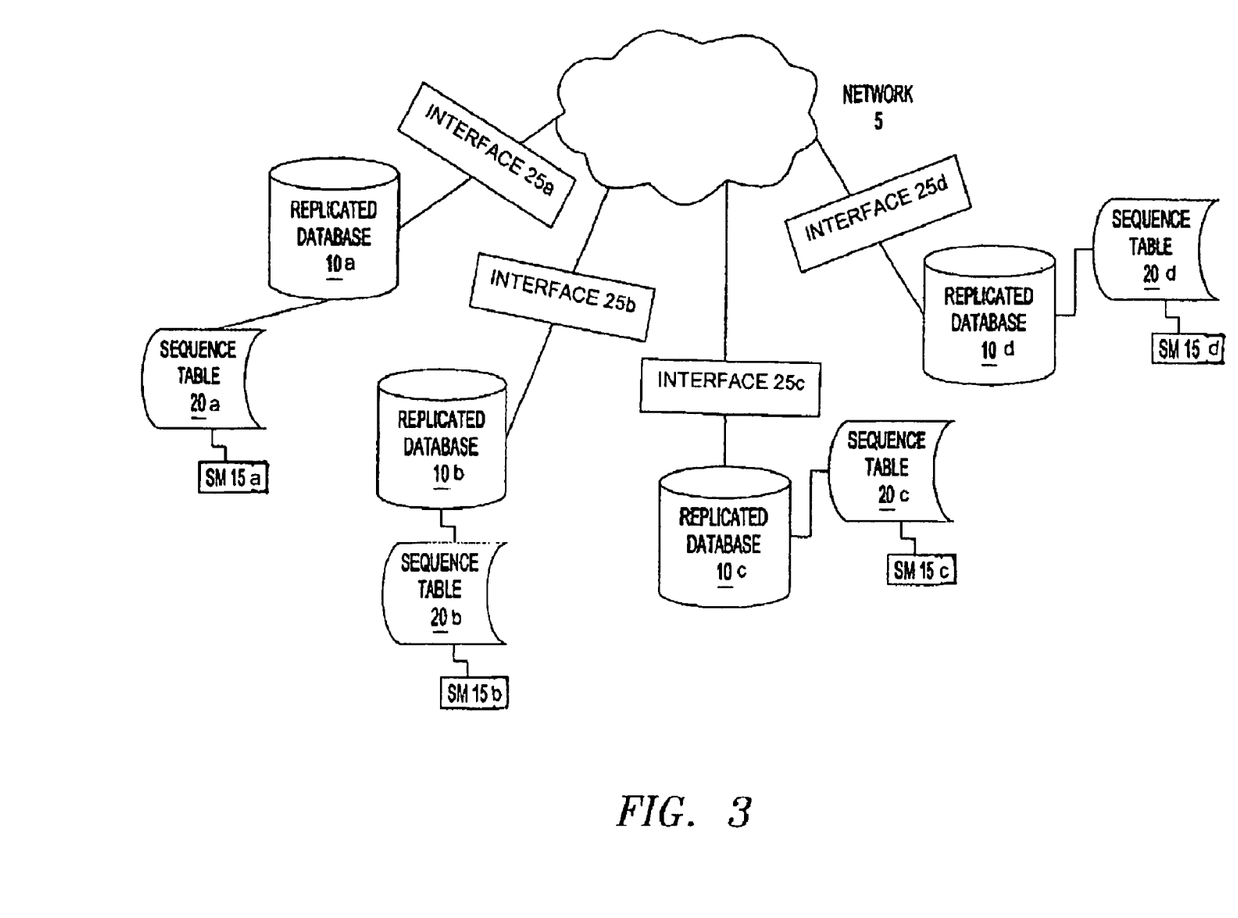
FIG. 3 is a diagram of a preferred embodiment of a system for synchronizing a network of replicated databases each including a synchronization manager, in accordance with the present invention.

Turning now to the drawings, FIG. 3 shows a preferred embodiment of a system 7 that includes a plurality of replicated version-managed databases 10*a*–10*d*, in accordance with the present invention. Generally, each database 10 may include a synchronization manager (SM) 15 and, optionally, a sequence table 20. In addition, each database 10 may include a plurality of states and versions, each with its own identification label, ID. Each database 10 may include other subsystems or components not important to the operation of the present invention. Although four databases 10 are shown, a system in accordance with the present invention may include any number of databases, as will be appreciated by those skilled in the art.

The databases 10 may be interconnected via one or more communications links, e.g., a network 5, which may include one or more wide area networks, local area networks, a variety of both. Alternatively, intermittent communications links including but not limited to floppy disks, tapes, store-and-forward email transmission, and dial-up data links may be used. Through these communication links, the databases may transfer files to each other and/or otherwise communicate with one another. Each database 10 may include its own users and processes and may change the data independently of the other databases 10.

Generally, each database 10 may operate autonomously, and the synchronization process on each database 10 may be autonomous as well. The system 7 may allow any database (a "local database") to autonomously establish a synchronization link with any other database (a "remote database"). In other words, each database 10 may operate and synchronize with other databases 10 on its own independent schedule, without requiring exclusive control of or any synchronous communication with other databases, and without requiring an exclusive lock on the access of its own database.

For each synchronization link between databases, a single version may be identified in each linked database as being the interface version (IV). The system 7 aims to ensure that the data contents within all IVs for a given link are identical. At any particular point in time, there may be differences, but these differences may be eliminated as the system propagates the changes to other linked IVs.

The SM 15 included with each database 10 enables the autonomous synchronization process. The SM 15 may reside on a separate computing device, such as a server or other computer, that may include one or more processors and/or memory (not shown), connected to the database. Alternatively, the SM 15 may reside on the database itself, e.g., as a subsystem or component of the database. The SM 15 is an agent that manages the operations that bring about synchronization between the databases, allowing the synchronization to be an automated process. The SM 15 sends any changes made on the local database to any or all of the remote databases 10, and receives any changes sent by any of the remote databases. Each of these activities may operate autonomously and/or asynchronously from one another. In other words, the SM 15 may send, receive, and/or reconstruct changes at any time, independently of other concurrent activities of the SM 15 or database 10. For example, the SM 15 may send several packages of changes made on the local database to all of the remote databases 10, then receive several packages of changes from one remote database, send another package of changes made on the local database, then receive several additional packages of changes from another remote database, and then reconstruct any or all of the remote changes on the local database.

The SM 15 may keep track of the packages of changes sent to and received from any remote database 10 in a sequence table 20 and may reconstruct those changes on the local database, ensuring identical data between the local database and the remote databases 10. The system 7 may not require explicit states in the version managed database 10, but for the purposes of illustrating the invention, the present discussion includes a plurality of explicit states. The sequence table 20 includes information about the states and the relationships between the states. Specifically, the sequence table 20 includes the sequence numbers associated with the state as well as optionally including other pertinent information. These sequence numbers identify the changes from one state to another, and there are two types. The first type, the local sequence number, identifies the changes made on the local database. Whenever a set of changes made on the local database is sent to remote databases, the local sequence number is incremented. The second type, the remote sequence number, identifies the changes made on the remote databases. Whenever the local database receives a set of changes made on a remote database, the remote sequence number corresponding to that remote database is recorded in the local sequence table, and the set of changes are recorded into the database 10.

Receiving only the changes and information regarding the changes made on the remote database substantially reduces the size of the file being transferred as compared to if the entire data set were transferred. With this feature and taking into account autonomous operation, the interconnection between the databases 10 may not require high bandwidth or low latency to provide adequate performance of synchronization.

Figure 4:
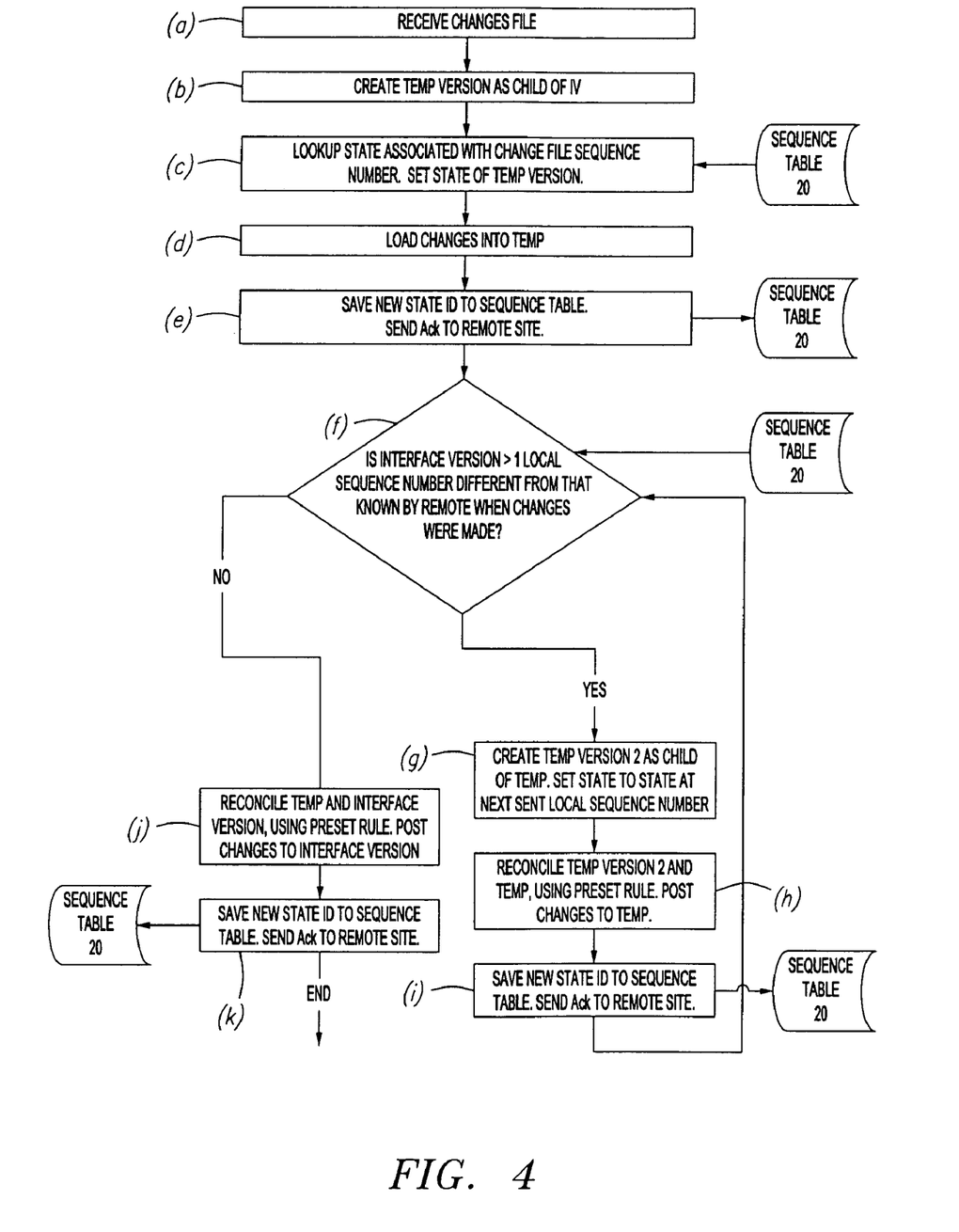
FIG. 4 is a flowchart, illustrating a method for reconstructing changes between a local database and a remote database using a synchronization manager, in accordance with the present invention.

Turning to FIG. 4, an exemplary method is shown for reconstructing changes using the SM 15 associated with a local database when the local database receives a change file from a remote database, at step (a). The change file may include the changes made on the remote database, the sequence number of the file, and the sequence number of the local database known by the remote database at the time the change file was sent. This pair of sequence numbers (local and remote) creates an identifier of the change file and its changes that may be stored in the sequence table 20.

The SM 15 nominates a version as being the target of synchronization with the remote database, identifying it as the interface version, IV. The SM 15 creates a temporary version (Temp version) as the child of the IV, at step (b). The SM 15 then searches for the state on the local database associated with the sequence number of the local database identified in the change file, i.e., the sequence number known by the remote database at the time the change was sent. The SM 15 then points the Temp version to that state at step (c). Then, in step (d), the SM 15 loads the changes into that Temp version. This change in the Temp version creates a new state, and the ID of this new state is added to the sequence table 20, at step (e). The SM 15 then sends an acknowledgement to the remote database that sent the change file.

The objective of the SM 15 is to reconstruct the changes in the change file on the local database, and, when achieved, manipulate the versions so that the IV on the local database refers to an identical state as the IV on the remote database that sent the change file, thereby ensuring that the databases are in synch. In reconstructing the changes, the SM 15 reconciles the changes from the change file loaded in the Temp version with any changes made on the local database to the IV and then posts the reconciled state onto the IV.

The method of reconciling and posting a parent version and a Temp version is known in the art. The reconcile process finds the latest state that the two versions both had in their history, and identifies this as the common state. The process then finds the differences between the common state and the parent version's state and merges those differences to the Temp version. If there are conflicting changes to records, then the database system may either accept the change made to the parent version, the change made to the Temp version, or neither, reverting to the record state found in the common state. This merging of data creates a new state. The posting process then checks that the state of the parent version has not changed since the reconciliation process was started and points the parent version to that new state. Thus, the parent and Temp versions become identical.

Turning to step (f), the SM 15 determines whether to reconcile the parent and Temp versions. This is done by determining whether the difference between the IV local sequence number and the local sequence number in the change file, i.e., the sequence number known by the remote database at the time the change was sent, is greater than one. If the difference is greater than one, this suggests that there were too many sequences of changes made on the local database before the change file sent by the remote database was received by the local database. Thus, if the two versions are reconciled, then states associated with the sequence numbers in between the IV local sequence number and the local sequence number in the change file may not include the changes in the change file. In the event of conflicts being detected during the reconciliation process, the merged state may not reliably be reconstructed to be identical on the remote database. This may result in the databases having different states and different records after the synchronization process, which is not acceptable.

Thus, in order to reconcile the IV with the Temp version under these circumstances, the Temp version must be reconciled with all of the states created from the time that the local database sent the change file identified by the sequence number in the incoming change file up to the time that the last change was made on the local database. Step (g) begins this looping process. In this step, the Temp version creates another temporary child version, a grandchild version (Temp 2 version). This Temp 2 version is then pointed to the state associated with the sequence number just after the local sequence number in the change file. The local sequence number in the change file comes from the change files sent by the local database that was last received by the remote database. The local sequence number sent after that is the number with which the Temp 2 version's state is associated.

In step (h), the Temp version is reconciled with the Temp 2 version. In the case of conflicts, the system 7 may include preset rules to which the SM 15 may refer in handling these conflicts. These may be set by the administrator and may include the local database always wining, remote database always wining, or neither wining such that the prior state is used. Having preset rules to which the SM 15 may refer ensures that the same results may be reconstructed at the remote database and allows the synchronization process to be automated and hidden from users.

A new state is created by the reconciliation process, and the SM 15 then posts the results into the Temp version. The state's ID is saved onto the sequence table 20. The SM 15 then sends an acknowledgement to the remote database from which the change file came, at step (i). This acknowledgement includes the remote sequence number as received with the change file, and the local sequence number associated with the state that has just been reconciled. Then, referring back to step (f), the SM 15 again determines whether the difference between IV local sequence number and the local sequence number in the change file is greater than one. If it is, then steps (g)–(i) are repeated. But, if the difference is one, then all of the appropriate states have been reconciled. Next, in step (j), the IV version is reconciled with the Temp version, applying the preset rules, and the resulting state is posted to the IV. The newly created state's ID is then added to the sequence table 20, and the acknowledgement including the remote sequence number and the last local sequence number sent is sent to the remote database.

After all of the remote databases reciprocate this process, the end result is a synchronized system of replicated version-managed databases.

Figure 5A:
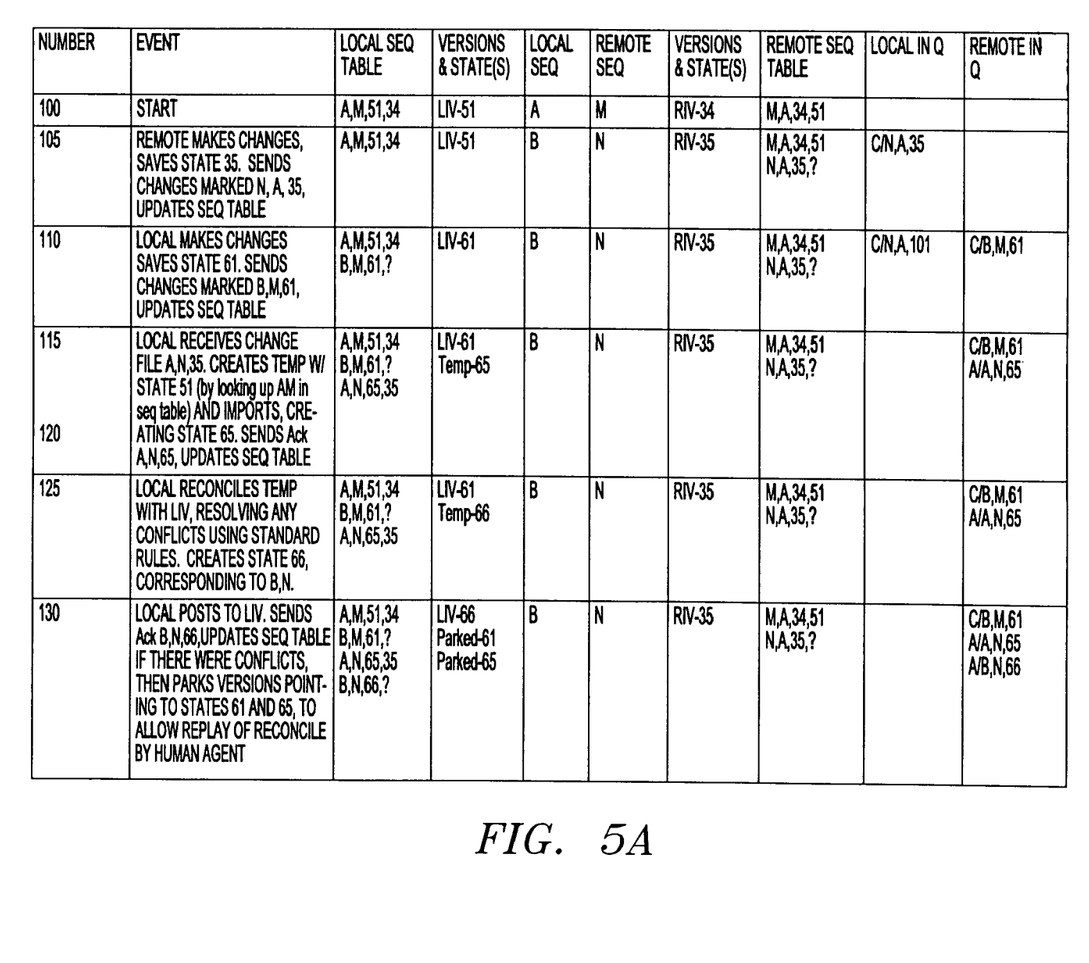
Figure 5C:
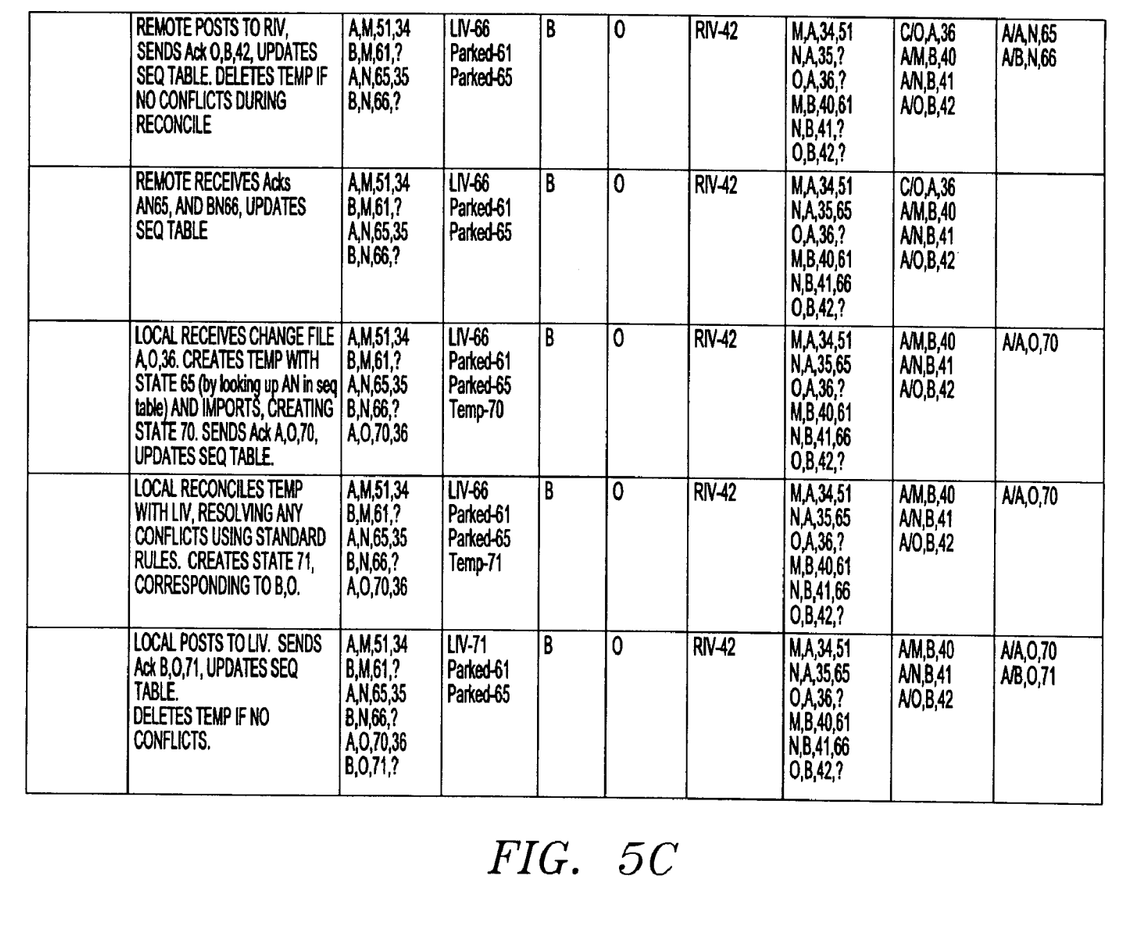
Figure 5D:
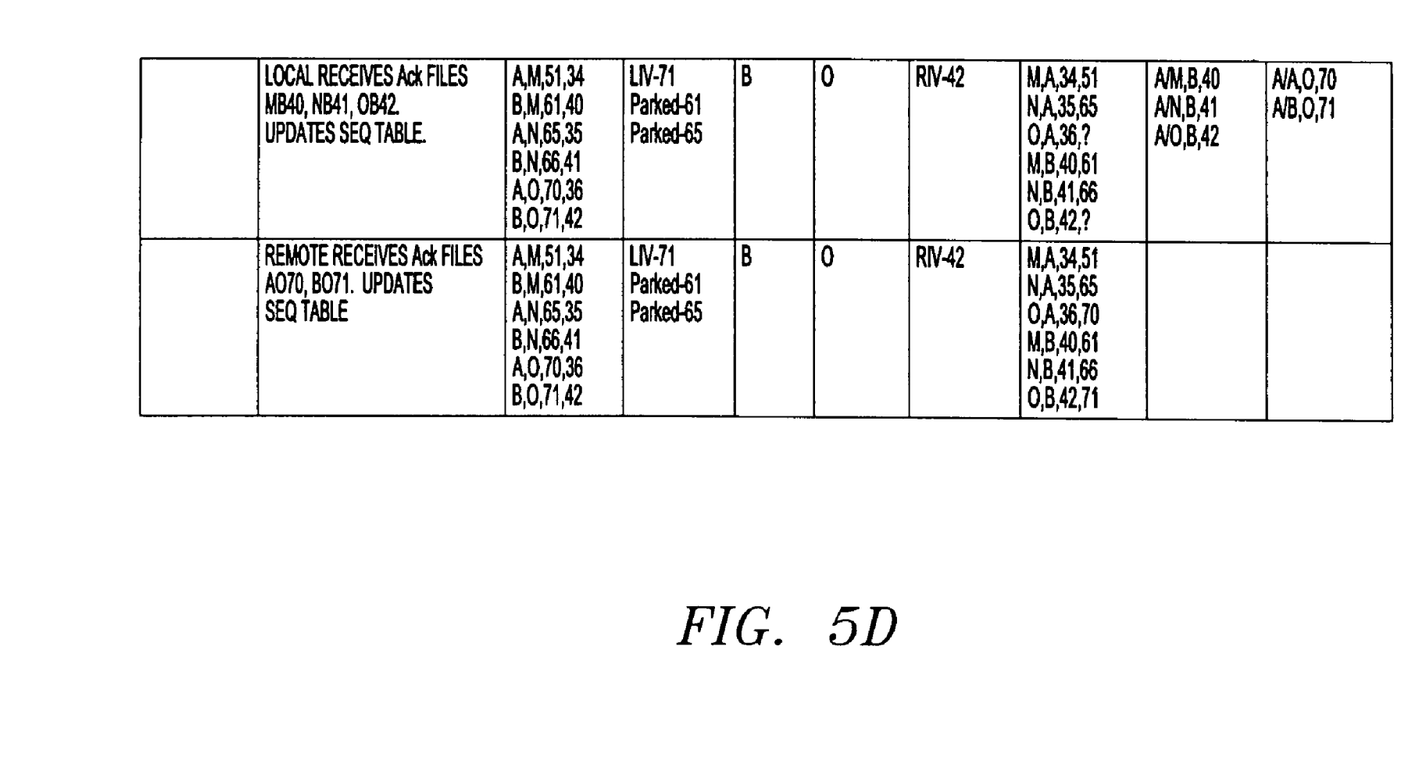
Figure 6A:
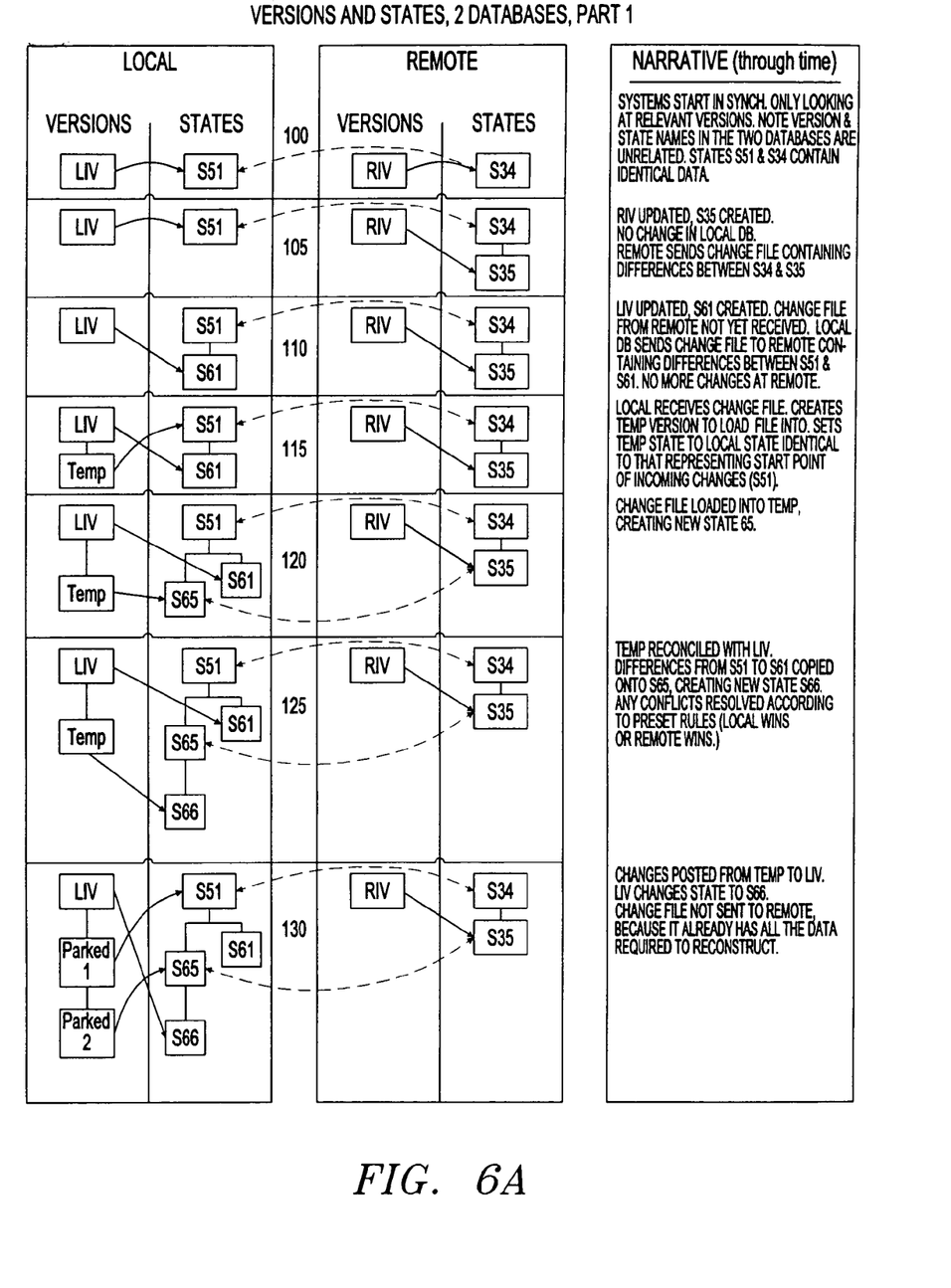
Figure 6C:
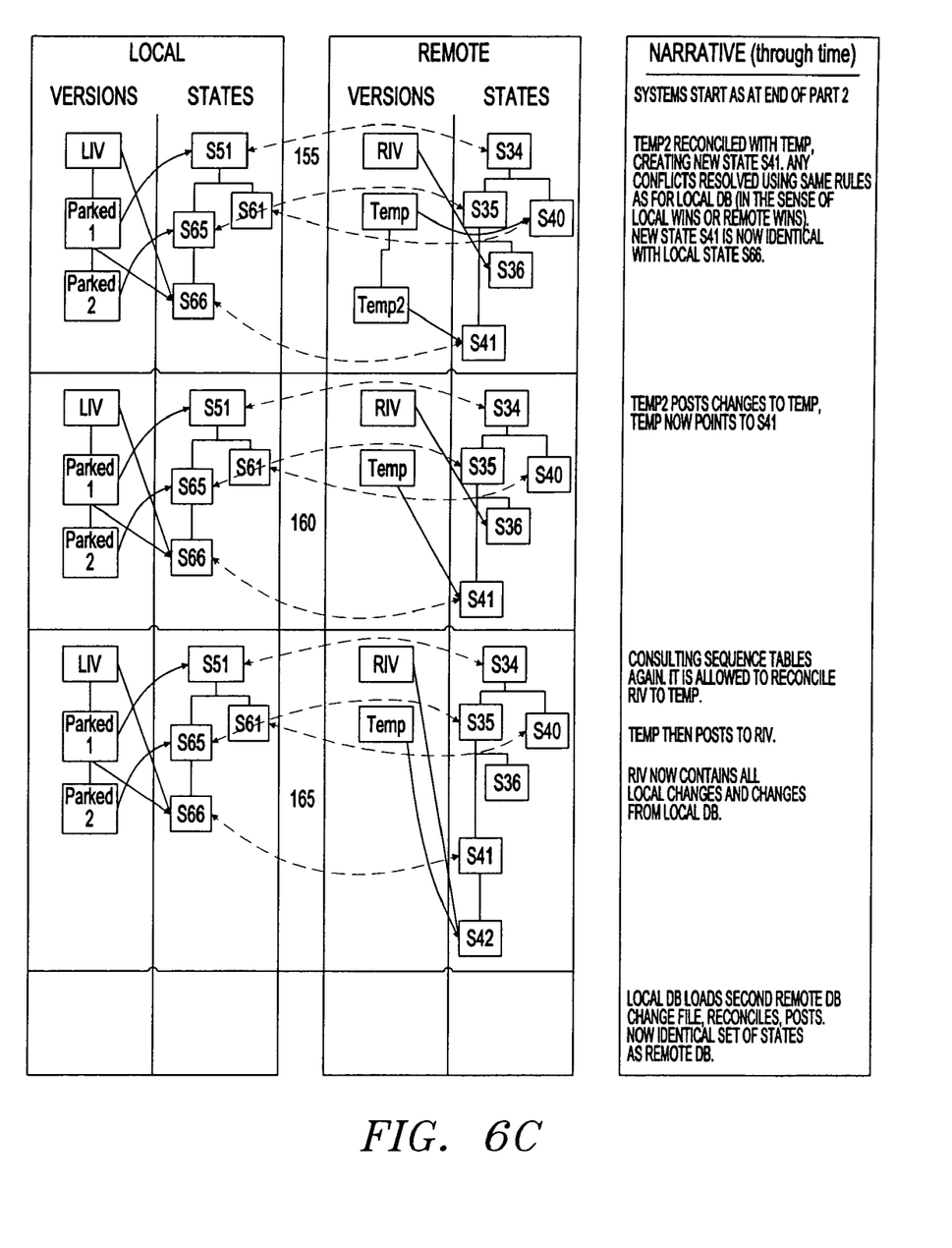

Turning now to FIGS. 5 and 6, an exemplary synchronization process is shown between a local replicated version-managed database and remote replicated version-managed database that are initially in synch at 100. Thus, S51 and S34 are identical in value. Each database, local and remote, nominates an interface version, LIV and RIV respectively, and they are set to their respective identical states. The local and remote sequence tables in FIG. 5*a* show the initial values of the sequence numbers and the respective states. Since the two databases are in synch, the values of the tables are identical as well.

The sequence table information is shown, formatted as follows. The first letter is the sequence number of the database on the local machine, and the second letter is the sequence number of the remote machine known at the time the last change file was sent. The next number is the corresponding state ID on the database of the local machine. Finally, the last number is the ID of the corresponding state on the database of the remote machine. If the database on the local machine would not know the corresponding state on the database of the remote machine, then "?" is shown in its place. Logistically, there is no requirement for either database to know the other database's state IDs, but these IDs are included in this example to help illustrate the process. The necessary information to identify the change file is just the sequence number pairing of the local and remote databases.

At the next event 105, a set of record changes is made to the RIV on the remote database. A new state is created, derived from S34, including the change, and the RIV is set to that state S35. The remote database prepares a change file including the changes made, increments the remote database's sequence number on the remote database sequence table, and sends the file together with the local and remote sequence numbers, and, for the purposes of illustration, the local state ID. A change made on a database increments the sequence number corresponding to that database on that database's sequence table. In this case, referring to FIG. 5*a*, the remote sequence number on the remote table gets incremented from M to N and the change file is sent, which, after transmission delays, gets stored in the local database's data queue until the local database is ready to receive that change file.

It should be noted that in the process of transferring change files from one system to another, it is possible for change files to become lost or arrive in the wrong sequence. Having sequence numbers associated with the change files follow a simple scheme of incrementing by one for each file sent allows a variety of methods for checking for and recovering from transmission errors to be used. Such methods are known in the art, and are not discussed herein. Any practical implementation may require that such methods be used.

The change file includes the differences between S34 and S35 on the remote database as well as an identifier including the information that is illustrated in FIG. 5, e.g., namely C/N,A,35. The first letters are shown as either a "C/" or "A/". This indicates whether the change file includes changes made on the database that sent the change file "C/" or whether the change file includes an acknowledgement, "A/", acknowledging that the database to which the change file was sent has received the change file. The next two letters indicate the sequence numbers of the databases. The letter, N, indicates the sequence number of the database on the local machine, and the letter, A, is the sequence number of the database on the remote machine known at the time the change was sent. The next number, 35, is the ID of the state on the database that includes the changes made.

During event 110, the local database makes a change, creating a new state derived from S51 with those changes, S61. The local database sends a change file labeled, C/B,M,61, that is stored in the remote database data queue until the remote database is ready to receive and reconstruct the changes in the change file. LIV is set to S61. Turning to events 115 and 120, the local database receives the remote database's change file, C/N,A,35. As shown in FIG. 6*a*, the local database then begins the reconstruction process. A child temporary (Temp) version is created from the LIV and is set to the local state identical to that representing the starting point of incoming changes, which would be the state associated with (A,M), S51. The changes are then loaded into the Temp version, thus creating S65. The local database then sends an acknowledgement, A/A,N,65, which is stored in the remote database data queue, and updates the sequence table, A,N,65,35. Note that the state corresponding to A, S65 on the local database, is identical to the state corresponding to N, S35.

Turning to event 125, the local database sequence number known by the remote database in change file is A. The LIV sequence number is B. Thus, the difference is only one, (A=1, B=2, B−A=2−1=1). Under this condition, referring to step (f) in FIG. 4, the SM 15 may then proceed to reconcile the Temp version with the LIV. As explained above, any conflicts may be resolved automatically using preset rules. A new S66 is created, corresponding to B,N. In event 130, the local database posts the results of the reconciliation to LIV, and then sends an acknowledgement, A/B,N,66 and updates the sequence table, B,N,66,?. Again, the "?" exists because the local database does not know the corresponding state on the remote database yet. Note that a change file is not sent to the remote database because the remote database already has all of the information it needs to reconstruct the changes on the remote database.

In this illustration, it is assumed that conflicts arose during the reconciliation process, and that, as a result, two new child versions are created from the LIV, Parked 1 and Parked 2. These two versions point to S61 and S65, respectively.

This allows a user to review the reconciliation process at some later time in case the conflicts were not correctly resolved. If the user decides during this review process that a resolution other than that applied by the preset rules would be appropriate, then that alternative resolution may be made. By then, reconciling and posting the revised state to the IV, the state of the IV may be changed, and the normal synchronization process of this invention may propagate that revised resolution to all linked databases.

Turning to event 135, a change is made on the remote database, and the RIV is updated to the new state, S36. The remote database sends a change file identified as C/O,A,36 and updates the sequence table accordingly, O,A,36,?. Next, at event 140 and 145, the remote database receives a change file from the local database, C/N,A,35. This is the change file that was sent back at event 105. The remote database creates a Temp version from the RIV, Temp, and again sets it to the state identical to the starting point of incoming changes, S34, (A,M) in the sequence table. The changes in the file are then imported into the Temp version, creating S40. Then, the remote database sends an acknowledgement, A/M,B,40 and updates the sequence table, M,B,40,61. Note that the remote database knows the corresponding state on the local database, S61 because that information was in the change file.

During event 150, the RIV sequence number is O, but the remote database sequence number known by the local database in the change files is M. Thus, given that M=1 and O=3, O−M=3−1=2, the difference between the RIV sequence number and the sequence number known by the local database is two. There are too many steps between M and O to allow reconciliation between these two versions directly. According to FIG. 4, the SM 15 then proceeds to step (g). A grandchild version is created, Temp 2, and is set to the state associated with the sequence number just after the remote database sequence number in the change file. The remote database sequence number in the change file is M (C/C,B,M,61), so the next sequence number is N, and, thus, Temp 2 version points to S35.

In event 155, the remote database reconciles Temp with Temp 2, applying the preset conflict rules, and creates S41. The remote database then posts the results to Temp, setting it to S41, and then sends an acknowledgement, A/N,B,41 and updates the sequence table, N,B,41,?, in event 160. If there are no conflicts, as assumed for this illustration, there is no need to provide for later revision by preservation of parked versions, and Temp 2 is deleted.

At this point, RIV is set to O,A, S36 and the Temp version is set to N,B, S41. Going back to step (f) in FIG. 4, O=2, N=1, O−N=2−1=1, there is only a difference of one between the steps. RIV and Temp may now be reconciled. Turning to event 165, the remote database reconciles Temp with the RIV, thus creating S42, and the results are posted to RIV.

The rest of the synchronization process is not shown in FIGS. 6(*a*)–(*c*) but is explained in FIGS. 5(*b*)–(*c*). Turning to event 170, the remote database posts to RIV and sends an acknowledgement, A/O,B,42, updating the sequence table as well, O,B,42,?. If there are no conflicts, the Temp version is deleted.

The remote database then receives the acknowledgements sent by the local database, A/A,N,65 and A/B,N,66, from the remote database's data queue and updates the sequence table accordingly in event 171. In event 172, the local database receives the change file C/A,O,36 from its data queue. A Temp version is create and set to S65, which is (A,N) on the sequence table. The changes are then imported, creating S70. The local database sends an acknowledgement and updates the sequence table accordingly. Since the difference between the LIV sequence number, B, and the local database sequence number on the change file, A, is one, these two versions may be reconciled, as done in event 173, and the results are posted in LIV in event 174. In events 175 and 176, the acknowledgements are cleaned up in the respective data queues and updated in the respective sequence tables.

While embodiments of the present invention have been shown and described, various modifications may be made without departing from the spirit and scope of the present invention, and all such modifications and equivalents are intended to be covered.

What is claimed is:

1. A method for synchronizing a local replicated database with one or more remote replicated databases, comprising:
   sending recent local changes made on the local database to a remote database;
   receiving changes made on the remote database from the remote database; and
   reconstructing the received changes received from the remote database on the local database,
   wherein any of the sending, receiving, and reconstructing steps may be performed independently from each other,
   wherein the local and remote databases are version-managed databases, each having a plurality of versions, and wherein one version in the local database is nominated as an interface version, and wherein the reconstructing step is performed using the interface version,
   wherein changes sent between the local and remote databases are sent in change files, and wherein the reconstructing step comprises:
   (a) creating a child version from the interface version;
   (b) setting the child version to a state identical to a state at the remote database before a received change file comprising the received changes were made at the remote database;
   (c) loading the changes in the received change file into the child version;
   (d) determining whether there has been more than one change file sent by the local database since a most-recent change file sent by the local database and received and processed by the remote database before the remote database sent the received change file;
   (e) if there has been more than one change sent by the local database, reconciling the interface version with any intervening states of the local database following the state identified by the change file received from the remote database and preceding the interface version;
   (f) reconciling the interface version with the child version; and
   (g) posting the state comprising the results of reconciling the child version with the interface version to the interface version.

2. The method of claim 1, wherein the step of reconciling the interface version with any intervening states comprises:
   (i) creating a grandchild version from the interface version;
   (ii) setting the grandchild version to a state represented in a change file sent by the local database sequentially after the most-recent change file, and henceforth taking a "current" change file to be that sequential change file;
   (iii) reconciling the grandchild version with the child version;
   (iv) posting the state comprising results of reconciling the grandchild version with the child version to the child version; and
   (v) if another change file was sent from the local database after the "current" change file in the state to which the grandchild version in step (f) was pointing but before the state to which the interface version is pointing, then repeating steps (ii) through (v) using each change file sent by the local database following sequentially after the most-recent change file.

3. The method of claim 2, wherein the states are implicit.

4. The method of claim 2, wherein the states are explicit.

5. The method of claim 2, wherein the step of reconciling the grandchild version with the child version, comprises:
   merging differences between the grandchild and child versions; and
   resolving any conflicts between the grandchild and child versions according to a set of preset rules.

6. The method of claim 5, wherein the step of reconciling the grandchild version with the child version, further comprises:
   creating a first park version and a second park version; and
   setting the grandchild version in the first park version and setting the child version in the second park version if data in the grandchild version conflicts with data in the child version.

7. The method of claim 2, wherein the step of reconciling the interface version with the child version, comprises:
   merging differences between the interface and child versions; and
   resolving any conflicts between the interface and child versions according to a set of preset rules.

8. The method of claim 7, wherein the step of reconciling the interface version with the child version, further comprises:
   creating a first park version and a second park version; and
   setting the interface version in the first park version and setting the child version in the second park version if data in the interface version conflicts with data in the child version.

9. A method for synchronizing a local replicated database with a remote replicated database, comprising the steps of:
   autonomously and asynchronously sending changes made on the local database to the remote database, independent of any steps of receiving and reconstructing changes;
   autonomously and asynchronously receiving changes made on the remote database to the local database, independent of any steps of sending and reconstructing changes; and
   autonomously and asynchronously reconstructing received changes made on the remote database on the local database, independent of any steps of sending and receiving changes,
   wherein each of the local and remote databases is a version-managed database comprising a plurality of versions, and wherein a version in each of the local and remote databases is nominated as a local interface version and a remote interface version, respectively,
   wherein changes sent between the local and remote databases are sent in change files,
   wherein each change file sent by the local database comprises a local sequence number identifying a state of the local database at the time the change file is sent and a remote sequence number identifying a state of the remote database known by the local database, and wherein each change file sent by the remote database comprises a remote sequence number identifying a state of the remote database at the time the change file is sent and a local sequence number identifying a state of the local database known by the remote database at the time the change file is sent, and
   wherein the reconstructing step comprises:
   (a) creating a child version of the local database set to a state associated with a local sequence number in a received change file received from the remote database;
   (b) loading the received change file into the child version;
   (c) determining whether a difference between a sequence number associated with the local interface version and the local sequence number of the change file is more than one;
   (d) if the difference is more than one, reconciling intervening versions of the local database, comprising:
      (i) creating a grandchild version of the local database set to a state associated with a sequence number immediately following the local sequence number of the received change file;
      (ii) reconciling the child version with the grandchild version;
      (iii) posting reconciliation results of reconciling the child version with the grandchild version to the child version;
      (iv) if a difference between the local sequence number of the local interface version and the sequence number of the child version is more than one, then repeating steps (i) to (iv) using a state of the local database associated with a sequence number next following the local sequence number of the received change file;
   (e) reconciling the interface version with the child version; and
   (f) posting a state comprising reconciliation results of reconciling the interface version with the child version to the interface version.

10. The method of claim 9, wherein the step of reconciling the interface version with the child, comprises the steps of:
    merging differences between the interface and child versions; and
    resolving any conflicts between the interface and child versions according to a preset rules.

11. The method of claim 10, wherein the step of reconciling the interface version with the child version, further comprises the step of:
    creating a first park version and a second park version; and
    setting the interface version in the first park version and setting the child version in the second park version if data in the interface version conflicts with data in the child version.

* * * * *